March 26, 1968
J. C. HOWARD
3,374,966
CONTROL SYSTEM
Filed July 19, 1966
2 Sheets-Sheet 1
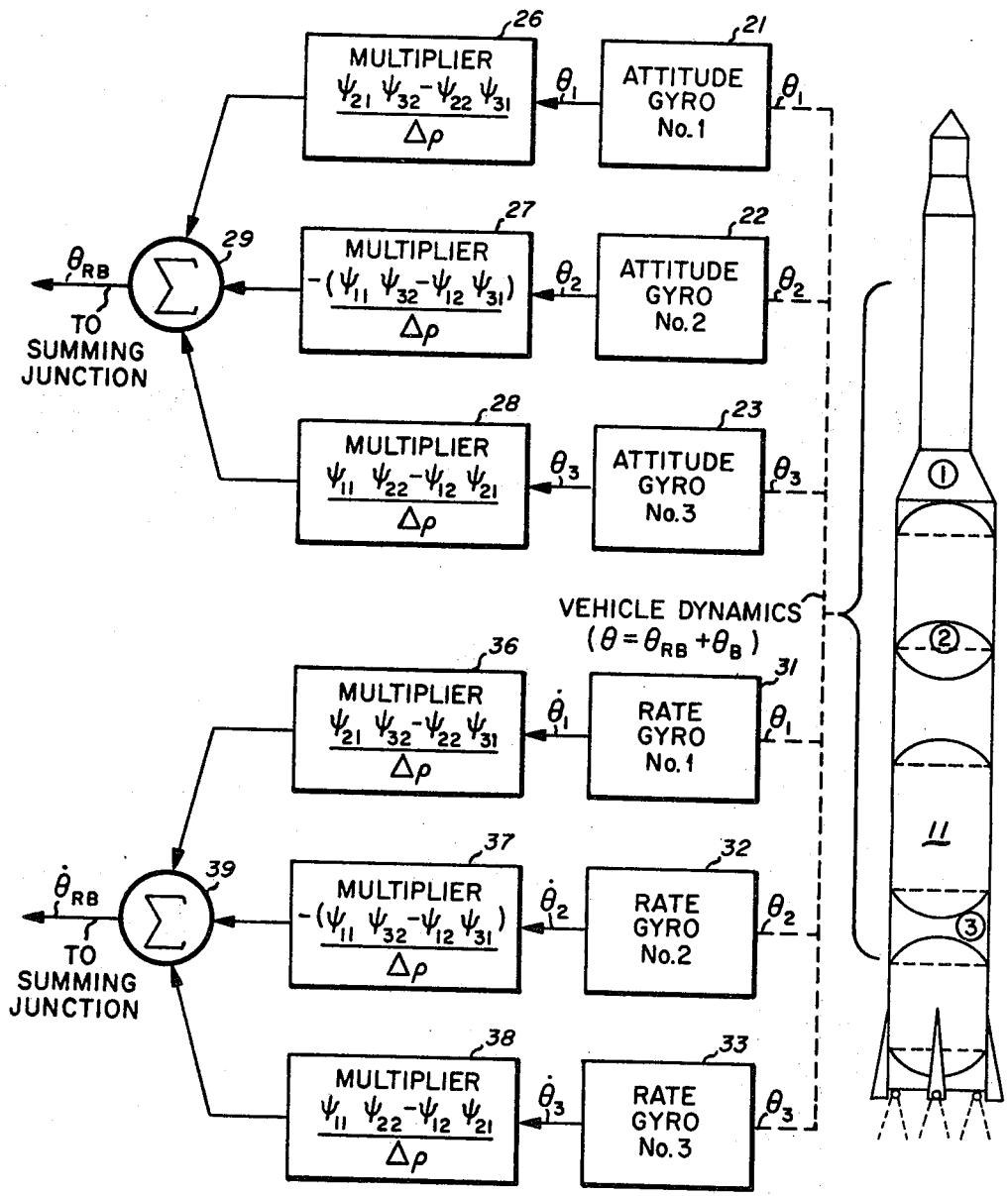
Fig_1
INVENTOR.
JAMES C. HOWARD
BY
ATTORNEYS

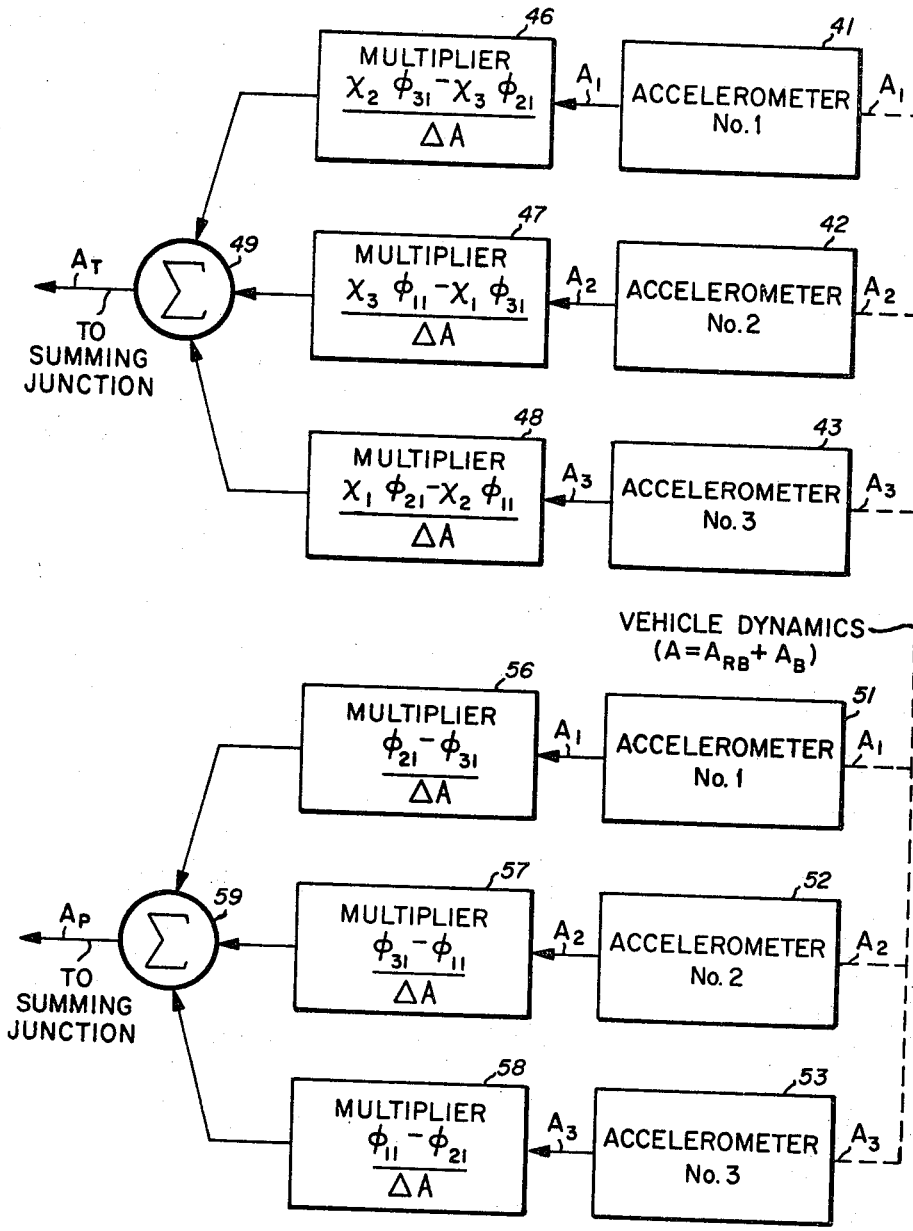
Fig_2

United States Patent Office 3,374,966
Patented Mar. 26, 1968

3,374,966
CONTROL SYSTEM
James C. Howard, Sunnyvale, Calif., assignor to the United States of America as represented by the Administrator of the National Aeronautics and Space Administration
Filed July 19, 1966, Ser. No. 566,396
5 Claims. (Cl. 244—3.2)

ABSTRACT OF THE DISCLOSURE

In a large flexible space vehicle, signals from sensors detecting the motion of the vehicle are processed to reduce or eliminate the effects on the signals of bending motion of the vehicle. The processing is performed in accordance with functions determined by the elastic properties of the vehicle. This processing reduces or eliminates the effects of bending motion on the signals, leaving the desired rigid-body motion portion of the signals for use in their manual or automatic control of the vehicle.

---

The invention described herein was made by an employe of the United States Government and may be manufactured and used by or for the Government for governmental purposes without the payment of any royalties thereon or therefor.

This invention relates in general to control systems, and relates more particularly to such systems for the guidance of large flexible space vehicles.

During the flight of space vehicles, they are controlled by either manual or automatic means. In manual control, signals from different sensors are used to provide displays of vehicle motion. In an automatic system, the signals from different sensors are supplied as inputs to a servo system which makes adjustments in the control parameters of the vehicle based on the inputs from the sensors to maintain the proper control of the vehicle.

In both manual and automatic systems, it is essential that accurate information be available at all times as to the motion of the vehicle so that this can be compared with the desired motion and any required corrective measures taken. This need for accurate information is complicated by the fact that such vehicles are elastic bodies and thus have components of both rigid-body motion and bending motion. It is, of course, only the rigid-body motion which is important for flight control purposes, but the sensors utilized to supply the signals for control do not distinguish between the two types of motions, so that the sensor outputs represent both rigid-body motion and bending motion. This is undesirable for control purposes, since in manual control, the bending motion component of the sensor outputs contaminates and confuses the display of vehicle motion, while in automatic systems, the bending motion component of the sensor outputs represents a spurious signal which renders control more difficult.

Heretofore, the prior art has attempted to solve this problem of the presence of bending motion components in the sensor outputs by filtering these outputs in an effort to separate the bending motion component from the rigid-body motion component and utilize only the rigid-body portion. This approach is reasonably satisfactory where there is a significant separation between the frequencies of the elastic modes and the closed-loop frequency of the controlled system. However, the effectiveness of this method decreases as the frequency of the bending signals approaches the control frequency, and when the frequency of the bending signals closely approaches or coincides with the control frequency, as it does in large flexible launch vehicles and in aircraft fuselages of the future, this filtering technique is essentially ineffective. This represents a serious problem, since these bending motion signals may produce vehicle instability if they are not removed from the feedback loop of controlled systems, or they may cause the controlling agent to generate bending motion to such an extent that structural failure of the vehicle occurs.

In accordance with this invention, there is provided a novel and effective way to substantially remove the bending motion components of the signals from the sensor outputs so as to leave only the desired rigid-body motion components of the signals. This is accomplished by operating on the sensor output signals in accordance with processing functions which are predetermined in relation to the predetermined elastic properties of the vehicle to be controlled. These processing functions are determined in advance, based on the calculated response of the vehicle as an elastic body undergoing vibration in response to a forcing function. These calculated processing functions may then be used to design suitable networks, such as multipliers, which operate on the sensor outputs to modify them in a manner which eliminates or substantially reduces the bending motion components present therein. These modified sensor outputs may then be utilized for controlling the vehicle, in either a manual or automatic system.

The present invention has the advantage of being independent of the relative frequencies of the bending signals ad the control frequency, since it is fully effective even when these frequencies coincide. Further, this invention, by determining the desired processing functions in advance of the flight of the vehicle, eliminates any need for on-board computational facilities in the vehicle to calculate these functions during flight.

It is therefore an object of this invention to provide an improved system for controlling the flight of large flexible space vehicles.

It is a further object of this invention to provide an improved system for controlling the flight of a large flexible space vehicle whose motion includes both rigid-body motion and bending motion which is detected by sensors carried by the vehicle, in which system the sensor output signals are processed to reduce or eliminate the bending motion components therein.

It is an additonal object of the present invention to provide a system for controlling the flight of a large flexible space vehicle whose motion includes both rigid-body motion and bending motion which is detected by sensors carried by the vehicle, in which system the sensor output signals are operated on by processing functions determined by the elastic properties of the vehicle to reduce or eliminate the bending motion components in the sensor output signals.

It is a further object of this invention to provide a system for controlling the flight of a large flexible space vehicle whose motion includes both rigid-body motion and bending motion which is detected by sensors carried by the vehicle, in which the effects of the bending motion on the sensor output signals are reduced or eliminated independently if the relative frequencies of the bending motion signals and the closed-loop frequency of the controlled system.

It is an additional objective of the present invention to provide a system for controlling the flight of a large flexible space vehicle whose motion includes both rigid-body motion and beinding motion which is detected by sensors carried by the vehicle, in which system the sensor output signals are operated on by processing functions determined by the elastic properties of the vehicle to reduce or eliminate the bending motion components in the sensor output signals, the processing functions being determined in advance of the flight to eliminate the need for calculating such functions during the flight.

Objects and advantages other than those set forth above will be apparent from the following description when read in connection with the accompanying drawings, in which:

FIGURE 1 schematically illustrates, in block diagram form, one embodiment of the invention for processing attitude and attitude rate signals, employing sensors at three locations on the vehicle and utilizing two bending modes to represent the motion of the system; and FIGURE 2 schematically illustrates in block diagram form, the processing of translational and rotational acceleration signals in accordance with this invention and in conjunction with the attitude and attitude rate signals of FIGURE 1.

Prior to discussing the details of the operation of this invention, the following material relative to theoretical considerations of vibrating bodies will provide a basis for better understanding the invention. Considering a large flexible launch vehicle, such as vehicle 11 in FIGURE 1, as a beam, the following applies.

When a beam is vibrating under the influence of a concentrated or a distributed forcing function, the total displacement can be described in terms of the normal modes of free vibration and the generalized coordinates. A normal mode of vibration is the space function or shape the vibrating beam assumes when it is oscillating at one of its natural frequencies. The generalized coordinates are the functions which describe the variation of modal amplitude with time. These functions can be obtained by solving the partial differential equation of motion for an elastic beam which is moving under the influence of concentrated or distributed forcing functions. If shear deformation and rotary inertia are neglected, the plane elastic motion of a continuous beam is described by the following partial differential equation, as set forth, for example, in "Vibration Problems in Engineering," Timoshenko, Stephen and Young, D. Van Nostrand Co., 1955.

$$\frac{\partial^2}{\partial x^2}EI(x)\frac{\partial^2 y(x,t)}{\partial x^2}+m(x)\frac{\partial^2 y(x,t)}{\partial t^2}=P(x,t) \quad (1)$$

where:
E is Young's modulus of elasticity.
$I(x)$ is the second moment of area.
$t$ is time.
$x$ is the distance measured along the longitudinal axis.
$m(x)$ is the mass per unit length.
$P(x, t)$ is the lateral force distribution.

The normal modes of vibration are obtained by solving the partial differential equation of motion for the free oscillations of an elastic beam. The relevant equation is:

$$\frac{\partial^2}{\partial x^2}EI(x)\frac{\partial^2 y(x,t)}{\partial x^2}+m(x)\frac{\partial^2 y(x,t)}{\partial t^2}=0 \quad (2)$$

A solution to this equation may be obtained by assuming that the variables are separable and by using the appropriate boundary conditions for the beam. A free-free beam is characterized by the absence of end constraints, that is, the bending moments and shear forces are zero at each end. With the use of these boundary conditions, Equation 2 may be solved to obtain the spatial functions which may then be used to describe the displacement of a beam which is undergoing forced oscillations. In terms of the displacement and time functions, the total bending displacement is given by:

$$y(x,t)=\sum_{j=1}^{\infty}\phi_j(x)q_j(t) \quad (3)$$

Where $\phi_j(x)$ are the modal displacement functions and $q_j(t)$ are the generalized coordinates, or the functions which describe the variation of modal amplitude with time.

Upon substitution from Equation 3 in Equation 1, the following equation is obtained:

$$\frac{\partial^2}{\partial x^2}EI(x)\frac{\partial^2}{\partial x^2}\sum_{j=1}^{\infty}\phi_j(x)q_j(t)+m(x)\frac{\partial^2}{\partial t^2}\sum_{j=1}^{\infty}\phi_j(x)q_j(t)=P(x,t) \quad (4)$$

When each side of Equation 4 is multiplied by $\phi_i(x)$ and integrated over the length of the beam, taking advantage of the orthogonal property of the normal modes, the equation of motion for the $j$th mode assumes the following form:

$$M_j\ddot{q}_j(t)+K_jq_j(t)=F_j(t) \quad (5)$$

Where $M_j$ is the generalized mass of the beam in the $j$th mode of vibration. A dot denotes differentiation with respect to time. The generalized stiffness and the generalized forcing function in the $j$th mode of vibration are $K_j$ and $F_j$, respectively. These quantities are defined as follows:

$$M_j=\int m(x)\phi_j^2(x)dx \quad (6)$$

$$K_j=\int \phi_j(x)\left[\frac{\partial^2}{\partial x^2}EI(x)\frac{\partial^2\phi_j(x)}{\partial x^2}\right]dx \quad (7)$$

$$F_j(t)=\int P(x,t)\phi_j(x)dx \quad (8)$$

where the integrals are taken over the length of the beam. Equation 6 does not include the effects of rotary inertia, nor does Equation 7 reflect the influence of shear deformation. Although shear deformation and rotary inertia should, in general, be included in any mathematical model which is being used to determine modal data, a discussion of these effects is not relevant to the present invention, where the main objective is to process measured sensor outputs in such a way that signal intelligence indicative of rigid-body motion is extracted from combined rigid-body and bending motion signal intelligence to provide a desired output signal. Equation 5 may be rewritten as follows:

$$\ddot{q}_j(t)+\omega_j^2q_j(t)=\frac{F_j(t)}{M_j} \quad (9)$$

$$\omega_j^2=\frac{K_j}{M_j} \quad (10)$$

where $\omega_j$ is the natural frequency of the $j$th free-free mode. The external forcing function consists of all aerodynamic forces, thrust forces, engine control-servo inertia forces, and propellant sloshing forces.

In practice, an elastic beam will possess some dissipative forces which provide damping. Since the dissipative energy is usually small in comparison to the elastic and kinetic energies, the lower modes will be very lightly damped. The dissipative force can be taken into account by adding a small viscous damping term to Equation 9. When this is done Equation 9 assumes the following form:

$$\ddot{q}_j+2\zeta_j\omega_j\dot{q}_j+\omega_j^2q_j=\frac{F_j}{M_j} \quad (11)$$

where $\zeta_j$ is the damping ratio in the $j$th bending mode. A value of $\zeta_j=0.005$ was assumed in the present example.

In terms of the normal modes and the corresponding generalized coordinates, the total displacement can be expressed as follows:

$$y(x,t)=\sum_{j=P,T,1}^{n}\phi_j(x)q_j(t) \quad (12)$$

where the normal modes are understood to include the rigid-body mode of translation of the center of gravity, and the rigid-body mode of rotation of the beam about its center of gravity. In this formulation, the normal mode of translation is unity and the corresponding generalized coordinate is $q_T$. In the rotational mode, the normal mode is $x - x_{cg}$ and the corresponding generalized coordinates is $q_D$. Equation 9 can still be used to describe the rigid-body modes, provided:

$$\omega_T = \omega_P = 0 \tag{13}$$

where $\omega_T$ is the frequency of the translational mode and $\omega_P$ is the frequency of the pitching mode. Note that all the aerodynamic forces are included in the external forcing function $F_j(t)$. In view of these comments, Equation 12 can be expanded as follows:

$$y(x,t) = q_T + (x - x_{cg})q_D 2 \sum_{j=1}^{n} \phi_j(x) q_j(t) \tag{14}$$

Let it be assumed that Equation 2 has been solved and that modal displacement functions and modal slope functions are available. If $\theta_i$ denotes the measured output from an attitude sensor located at station $i$ on the structure, then on differentiating Equation 14 with respect to $x$, the total angular displacement at location $i$ is obtained in the following form:

$$\theta_i = \frac{\partial y}{\partial x} = q_D + \frac{\partial \phi_1(x_i)}{\partial x} q_1 + \ldots + \frac{\partial \phi_n(x_i)}{\partial x} q_n \tag{15}$$

that is $$\theta_i = q_D + \sum_{j=1}^{n} \frac{\partial \phi_j(x_i)}{\partial x} q_j(t) \tag{16}$$

If $\partial \phi_j(x_i)/\partial x$ is denoted by $\psi_{ij}$, where $\psi_j(x_i)$ is the modal slope for the $j$th bending mode at location $i$, Equation 16 may be rewritten as follows:

$$\theta_i = q_D + \sum_{j=1}^{n} \psi_{ij}(x) q_j(t) \tag{17}$$

The measured output $\phi_i$ is seen to consist of $(n+1)$ unknown components; that is, there is the unknown pitching angle $q_D$ and the $n$ generalized coordinates $q_j$. However, a solution to Equation 17 is possible if $(n+1)$ sensors are used at $(n+1)$ distinct locations. In this case there would be $(n+1)$ measured outputs $\theta_i$, giving rise to $(n+1)$ equations for the $(n+1)$ equations for the $(n+1)$ unknowns as follows:

$$\begin{pmatrix} \theta_1 \\ \theta_2 \\ \theta_3 \\ \cdot \\ \cdot \\ \theta_n \\ \theta_{n+1} \end{pmatrix} = \begin{pmatrix} 1 & \psi_{11} & \psi_{12} & \cdots & \psi_{1n} \\ 1 & \psi_{21} & \psi_{22} & \cdots & \psi_{2n} \\ 1 & \psi_{31} & \psi_{32} & \cdots & \psi_{3n} \\ \cdot & \cdot & \cdot & & \cdot \\ \cdot & \cdot & \cdot & & \cdot \\ 1 & \psi_{n1} & \psi_{n2} & \cdots & \psi_{nn} \\ 1 & \psi_{n+1,1} & \psi_{n+1,2} & \cdots & \psi_{n+1,n} \end{pmatrix} \begin{pmatrix} q_D \\ q_1 \\ q_2 \\ \cdot \\ \cdot \\ \cdot \\ q_n \end{pmatrix} \tag{18}$$

This matrix equation can be solved to determine the unknown rigid-body rotation and the $n$ generalized coordinates as functions of the measured outputs from the sensors and the known modal data. Equation 18 may be written in abbreviated form as follows:

$$[\theta] = [\psi][Q] \tag{19}$$

where $[\theta]$ is a column vector of measured angular displacements, and $[Q]$ is a column vector consisting of the rigid-body pitch attitude and the $n$ generalized coordinates. To simplify the formulation, the first column of the matrix operator $[\psi]$ may be redefined to give:

$$[\psi] = \begin{pmatrix} \psi_{10} & \psi_{11} & \psi_{12} & \cdots & \psi_{1n} \\ \psi_{20} & \psi_{21} & \psi_{22} & \cdots & \psi_{2n} \\ \psi_{30} & \psi_{31} & \psi_{32} & \cdots & \psi_{3n} \\ \cdot & \cdot & \cdot & & \cdot \\ \cdot & \cdot & \cdot & & \cdot \\ \psi_{n0} & \psi_{n1} & \psi_{n2} & \cdots & \psi_{nn} \\ \psi_{n+1,0} & \psi_{n+1,1} & \psi_{n+1,2} & \cdots & \psi_{n+1,n} \end{pmatrix} \tag{20}$$

where $\psi_{j0} = 1$ for $j = 1, 2, \ldots, n+1$. From Equation 19 the column vector $[Q]$ is obtained in the following form:

$$[Q] = [\psi]^{-1}[\theta] \tag{21}$$

The inverse of the matrix $[\psi]$ is given by:

$$[\Psi]^{-1} = \frac{1}{\Delta_p} \begin{pmatrix} \Psi_{10} & \Psi_{20} & \Psi_{30} & \cdots & \Psi_{n0} & \Psi_{n+1,0} \\ \Psi_{11} & \Psi_{21} & \Psi_{31} & \cdots & \Psi_{n1} & \Psi_{n+1,1} \\ \Psi_{12} & \Psi_{22} & \Psi_{32} & \cdots & \Psi_{n2} & \Psi_{n+1,2} \\ \cdot & \cdot & \cdot & & \cdot & \cdot \\ \cdot & \cdot & \cdot & & \cdot & \cdot \\ \Psi_{1n} & \Psi_{2n} & \Psi_{3n} & \cdots & \Psi_{nn} & \Psi_{n+1,n} \end{pmatrix} \tag{22}$$

where $\Psi_{ij}$ is the cofactor of the element $\psi_{ij}$ in the matrix $[\psi]$, and $\Delta_p$ is the determinant of $[\psi]$. Upon substitution from Equation 22 in Equation 21, the rigid-body rotation is obtained in the form of a series as follows:

$$q_D = \frac{1}{\Delta_p}(\Psi_{10}\theta_1 + \Psi_{20}\theta_2 + \ldots \Psi_{n+1,0}\theta_{n+1})$$

that is:

$$q_D = \frac{1}{\Delta_p} \sum_{i=1}^{n+1} \Psi_{i0} \theta_i \tag{23}$$

The coefficient of $\theta_i$ in Equation 23 will be denoted by $P_{pi}(\Psi)$, and will subsequently be referred to as an attitude processing function, since this function is used to process the output from an attitude sensor located at $x_i$. With this notation, Equation 23 may be rewritten as follows:

$$q_D = \sum_{i=1}^{n+1} P_{pi}(\psi) \theta_i \tag{24}$$

where:

$$P_{pi}(\psi) = \frac{\Psi_{i0}}{\Delta_p} \tag{25}$$

To illustrate the method, Equation 18 will be solved for the case where $i = 3$ and $j = 2$. This is tantamount to the assumption that bending modes higher than the second may be neglected. With these values of the subscripts, Equation 18 reduces to:

$$\begin{pmatrix} \theta_1 \\ \theta_2 \\ \theta_3 \end{pmatrix} = \begin{pmatrix} 1 & \psi_{11} & \psi_{12} \\ 1 & \psi_{21} & \psi_{22} \\ 1 & \psi_{31} & \psi_{32} \end{pmatrix} \begin{pmatrix} q_D \\ q_1 \\ q_2 \end{pmatrix} = \begin{pmatrix} \psi_{10} & \psi_{11} & \psi_{12} \\ \psi_{20} & \psi_{21} & \psi_{22} \\ \psi_{30} & \psi_{31} & \psi_{32} \end{pmatrix} \begin{pmatrix} q_D \\ q_1 \\ q_2 \end{pmatrix} \tag{26}$$

therefore:

$$\begin{pmatrix} q_D \\ q_1 \\ q_2 \end{pmatrix} = \frac{1}{\Delta_p} \begin{pmatrix} \Psi_{10} & \Psi_{20} & \Psi_{30} \\ \Psi_{11} & \Psi_{21} & \Psi_{31} \\ \Psi_{12} & \Psi_{22} & \Psi_{32} \end{pmatrix} \begin{pmatrix} \theta_1 \\ \theta_2 \\ \theta_3 \end{pmatrix} \tag{27}$$

In this case, Equation 24 consists of three terms. Hence:

$$q_D = \sum_{i=1}^{3} P_{pi}(\psi) \theta_i \tag{28}$$

where:

$$P_{p1}(\psi) = \frac{\Psi_{10}}{\Delta_p} = \frac{(\psi_{21}\psi_{32} - \psi_{22}\psi_{31})}{\Delta_p} \tag{29}$$

$$P_{p2}(\psi) = \frac{\Psi_{20}}{\Delta_p} = \frac{(\psi_{11}\psi_{32} - \psi_{12}\psi_{31})}{\Delta_p} \tag{30}$$

$$P_{p3}(\psi) = \frac{\Psi_{30}}{\Delta_p} = \frac{(\psi_{11}\psi_{22} - \psi_{12}\psi_{21})}{\Delta_p} \tag{31}$$

and:

$$\Delta_p = [(\psi_{21}\psi_{32} - \psi_{22}\psi_{31}) - (\psi_{11}\psi_{32} - \psi_{12}\psi_{31}) + (\psi_{11}\psi_{22} - \psi_{12}\psi_{21})] \tag{32}$$

These equations then define the attitude processing functions or gains to be used with the outputs of the attitude sensors in the vehicle. These functions may be employed as shown schematically in FIGURE 1, in which vehicle 11 is provided with attitude sensors located at three different positions 1, 2 and 3 in the vehicle. These attitude sensors may be of any suitable type, such as attitude gyros 21, 22 and 23. As is well-known in the art, such attitude gyros produce an output signal which is a measure of the angular displacement of the vehicle in the plane of motion relative to the gyro axis. As indicated in FIGURE 1, the total angular displacement of the vehicle in the plane of motion has a component $\theta_{RB}$ which is the angular displacement due to rigid-body motion and which is the component to be isolated, and a component $\theta_B$ which is the angular displacement due to bending motion.

This total angular displacement is transmitted to the attitude gyros 21, 22, 23 and these devices produce output signals which are functions of the total angular displacements $\theta_1$, $\theta_2$, $\theta_3$ of the vehicle at the respective locations of these gyros. These attitude gyro outputs are supplied as inputs to associated multiplying networks 26, 27, 28, which operate on the signals in accordance with the processing functions set forth in Equations 29, 30, 31 and 32. That is, network 26 operates on the output of attitude gyro 21 in accordance with the processing function of Equation 29; network 27 operates on the output of attitude gyro 22 in accordance with the processing function of Equation 30; and network 28 operates on the output of attitude gyro 23 in accordance with the processing function of Equation 31. Networks 26, 27, 28 may be of any suitable type which are capable of operating on the input signals in the functional manner indicated thereon. For example, if the outputs from sensors 21, 22, 23 are in digital form or are converted to digital form, the processing represented by networks 26, 27, 28 may be carried out in a suitable digital computer, such as the IBM Type 7090. Alternatively, if the sensor outputs are to be handled in analog form, the processing may be performed in an analog processor in accordance with techniques described in "High Speed Analog Computers," Tomovic and Karplus, John Wiley and Sons, 1962. This analog processing may be performed either in an analog computer on the ground or by multiplier means including function generators which have been programmed in advance and placed on board the vehicle.

The outputs from networks 26, 27, 28 are combined in a summing device 29, and the output of summing device 29 is supplied, in the case of an automatic system, to a summing junction for summing the error signals. The output from device 29, designated $\theta_{RB}$, corresponds to the angular displacement in the plane of motion due to rigid-body motion alone, since the component of motion $\theta_B$ due to bending motion has been eliminated in processing networks 26, 27, 28.

The theory and circuitry discussed above for angular displacement may be extended to angular rates, as indicated by the following.

If $\dot{\theta}_i$ denotes the output from an angular rate sensor located at $x_i$ on the elastic structure, then differentiation of Equation 17 with respect to time yields the equation for the angular rates in the following form:

$$\dot{\theta}_i = \dot{q}_D + \sum_{j=1}^{n} \psi_{ij}(x) \dot{q}_j(t) \qquad (33)$$

As in the case of angular displacements, the solution of the angular rate problem requires that $(n+1)$ rate sensors be used at $(n+1)$ distinct locations.

The information obtained from this number of sensors is the amount required to permit separation of rigid-body rates from combined rigid-body and bending rates, by providing $(n+1)$ unknowns. The measured angular rates are related to the rigid-body pitching rate and the rates of change of the generalized coordinates in the same manner in which the angular displacements are related to the pitch attitude and the generalized coordinates. Hence:

$$[\dot{\theta}] = [\psi][\dot{Q}] \qquad (34)$$

where $[\dot{\theta}]$ is a column vector of measured angular rates, and $[\dot{Q}]$ is a column vector consisting of the rigid-body pitching rate and the rates of change of the generalized coordinates. The matrix $[\psi]$ is defined in Equation 20 where $\psi_{i0} = 1$ for $i = 1, 2, \ldots, n+1$. Equation 34 can be solved to obtain the column vector of unknown rates $[\dot{Q}]$ in terms of the measured rates and the known modal slopes:

$$[\dot{Q}] = [\psi]^{-1}[\dot{\theta}] \qquad (35)$$

where $[\psi]^{-1}$ is given by Equation 22. It follows that the measured angular rates are processed in the same manner as the measured angular displacements. Therefore:

$$\dot{q}_D = \sum_{i=1}^{n+1} P_{Di}(\psi) \dot{\theta}_i \qquad (36)$$

where the processing functions $P_{Di}(\psi)$ have the values given by Equation 25.

As shown in FIGURE 1, the rigid-body pitch rate may be extracted from the total pitch rate by operating on the output signals from rate gyros 31, 32, 33 in accordance with the determined processing functions. As with attitude gyros, 21, 22, 23, rate gyros 31, 32, 33 are positioned at the different locations in vehicle 11 and are acted upon by the total angular displacement $\theta$ which includes rigid-body motion and bending motion. The output signals from rate gyros 31, 32, 33 are functions of the rate of this angular displacement, as is well-known in the art. The output signals from the rate gyros may be designated as $\dot{\theta}_1$, $\dot{\theta}_2$, $\dot{\theta}_3$ respectively, to indicate that they represent the differential with respect to time of the angular displacement.

The outputs from rate gyros 31, 32, 33 are supplied as inputs to their associated processing function networks 36, 37, 38. These networks, for the situation discussed above where it was assumed that there were 3 sensor locations and 2 modal slope functions, may have the functional form represented in FIGURE 1. It will be seen that these functional forms correspond to Equations 29, 30 and 31, respectively. The outputs from networks 36, 37, 38 are supplied as inputs to a summing device 39 whose output may be supplied to a summing junction for error signals. Thus, the output from summing device 39 corresponds to the rigid-body attitude rate only, with the effect of the bending attitude rate eliminated.

If it is necessary or desirable to supplement the attitude and attitude-rate information of FIGURE 1 with acceleration feedback, this can be accomplished by this invention by processing the outputs of a number of accelerometers in accordance with appropriate processing functions. This is similar to the procedure described above for obtaining rigid-body attitude and attitude rate, except that because the rigid-body acceleration consists of a translational and a rotational component, an additional sensor is required to provide sufficient information for determining the rigid-body components of acceleration. The theoretical basis for this is as follows:

Let $A_i$ denote the output of an accelerometer which has its sensitive axis in the plane of the motion and perpendicular to the longitudinal axis of the vehicle. If second-order quantities are neglected, and if $(x_i - x_{cg})$ is the distance of the $i$th accelerometer from the center of gravity of the vehicle, then the linear acceleration at the $i$th accelerometer may be obtained by differentiating Equation 14 twice with respect to time.

$$A_i = \left[ \ddot{q}_T + (x_i - x_{cg}) \ddot{q}_D + \sum_{j=1}^{n} \phi_{ij} \ddot{q}_j \right] \qquad (37)$$

where $q_T$ is the component of rigid-body acceleration in the translational mode and $\phi_{ij} = \phi_j(x_i)$ is the modal displacement in the $j$th mode at sensor location $i$.

Because of the fact that the rigid-body acceleration has two components, the number of sensors required to provide sufficient information for determining the rigid-body components and the bending components is $(n+2)$. Hence, the equations to be solved are:

$$\begin{pmatrix} A_1 \\ A_2 \\ \vdots \\ A_n \\ A_{n+1} \\ A_{n+2} \end{pmatrix} = \begin{pmatrix} 1 & (x_1-x_{cg}) & \phi_{11} & \phi_{12} & \cdots & \phi_{1n} \\ 1 & (x_2-x_{cg}) & \phi_{21} & \phi_{22} & \cdots & \phi_{2n} \\ \vdots & \vdots & \vdots & \vdots & \ddots & \vdots \\ 1 & (x_n-x_{cg}) & \phi_{n1} & \phi_{n2} & \cdots & \phi_{nn} \\ 1 & (x_{n+1}-x_{cg}) & \phi_{n+1,1} & \phi_{n+1,2} & \cdots & \phi_{n+1,n} \\ 1 & (x_{n+1}-x_{cg}) & \phi_{n+2,1} & \phi_{n+2,2} & \cdots & \phi_{n+2,n} \end{pmatrix} \begin{pmatrix} q_T \\ q_P \\ \vdots \\ q_n \end{pmatrix}$$

(38)

This matrix equation can be solved to determine the unknown rigid-body accelerations and the $n$ bending accelerations as functions of the measured outputs from the sensors and known modal data. To render these equations more manageable, it is convenient to rewrite them in abbreviated form as follows:

$$[A] = [\phi][Q] \qquad (39)$$

where $[A]$ is a column vector of measured accelerations, and $[Q]$ is a column vector consisting of the translational acceleration, the pitching acceleration, and the $n$ bending accelerations. To simplify the formulation, the first two columns of the matrix $[\phi]$ are redefined as follows:

$$[\phi] = \begin{pmatrix} \phi_{1T} & \phi_{1P} & \phi_{11} & \cdots & \phi_{1n} \\ \phi_{2T} & \phi_{2P} & \phi_{21} & \cdots & \phi_{2n} \\ \phi_{3T} & \phi_{3P} & \phi_{31} & \cdots & \phi_{3n} \\ \vdots & \vdots & \vdots & \ddots & \vdots \\ \phi_{n+1,T} & \phi_{n+1,P} & \phi_{n+1,1} & \cdots & \phi_{n+1,n} \\ \phi_{n+2,T} & \phi_{n+2,P} & \phi_{n+2,1} & \cdots & \phi_{n+2,n} \end{pmatrix}$$

(40)

where:
$$\phi_{iT} = 1$$

and:
$$\phi_{iP} = (x - x_{cg}) \; i = 1, 2, \ldots, n+2$$

The column vector of unknown acceleration components is obtained from Equation 39 in the form:

$$[Q] = [\phi]^{-1}[A] \qquad (41)$$

where the inverse of the matrix $[\phi]$ is given by:

$$[\phi]^{-1} = \frac{1}{\Delta_A} \begin{pmatrix} \Phi_{1T} & \Phi_{2T} & \cdots & \Phi_{n+1,T} & \Phi_{n+2,T} \\ \Phi_{1P} & \Phi_{2P} & \cdots & \Phi_{n+1,P} & \Phi_{n+2,P} \\ \Phi_{11} & \Phi_{21} & \cdots & \Phi_{n+1,1} & \Phi_{n+2,1} \\ \Phi_{12} & \Phi_{22} & \cdots & \Phi_{n+1,2} & \Phi_{n+2,2} \\ \vdots & \vdots & & \vdots & \vdots \\ \Phi_{1n} & \Phi_{2n} & \cdots & \Phi_{n+1,n} & \Phi_{n+2,n} \end{pmatrix}$$

(42)

where $\Phi_{ij}$ is the cofactor of the corresponding element in the matrix $[\phi]$ and $\Delta_A$ is the determinant of $[\phi]$.

Upon substitution from Equation 42 in Equation 41, the rigid-body translational acceleration is obtained in the form of the series:

$$q_T = \frac{1}{\Delta_A}(\Phi_{1T}A_1 + \Phi_{2T}A_2 + \ldots + \Phi_{n+1,T}A_{n+1} + \Phi_{n+2,T}A_{n+2})$$

that is:

$$q_T = \frac{1}{\Delta_A}\sum_{i=1}^{n+2} \Phi_{iT}A_i \qquad (43)$$

The coefficient of $A_i$ in Equation 43 will be denoted by $P_{Ti}(\phi)$ and is the function to be used in processing the output from an accelerometer located at $x_i$ on the flexible structure, in order to obtain the rigid-body translational acceleration. Equation 43 shows that when the output from each accelerometer is processed in this way, the sum of the processed outputs gives the rigid-body translational acceleration. In terms of the processing functions $P_{Ti}(\phi)$, Equation 43 may be rewritten as follows:

$$q_T = \sum_{i=1}^{n+2} P_{Ti}(\phi)A_i \qquad (44)$$

where:

$$P_{Ti}(\phi) = \frac{\Phi_{iT}}{\Delta_A} \qquad (45)$$

Equations 41 and 42 give the rigid-body pitching acceleration in the form of the series:

$$\ddot{q}_p = \frac{1}{\Delta_A}(\Phi_{1P}A_1 + \Phi_{2P}A_2 + \ldots + \Phi_{n+1,P}A_{n+1} + \Phi_{n+2,P}A_{n+2})$$

that is:

$$\ddot{q}_p = \frac{1}{\Delta_A}\sum_{i=1}^{n+2} \Phi_{iP}A_i \qquad (46)$$

The coefficient of $A_i$ in Equation 46 is the function to be used in processing the output from an accelerometer located at $x_i$ in order to obtain the rigid-body pitching acceleration. This processing function will be denoted by $P_{Pi}(\phi)$. Equation 46 shows that the sum of the processed outputs gives the rigid-body pitching acceleration. In terms of the processing functions $P_{Pi}(\phi)$, Equation 46 may be rewritten in the following form:

$$\ddot{q}_p = \sum_{i=1}^{n+2} P_{Pi}(\phi)A_i \qquad (47)$$

where:

$$P_{Pi}(\Phi) = \frac{\Phi_{iP}}{\Delta_A}$$

Similarly, by using Equation 42 to obtain the appropriate processing functions, it is possible to determine modal accelerations from which may be derived modal rates and modal displacements. These quantities may be used in a feedback loop to supplement attitude and attitude rate information.

FIGURE 2 diagrammatically illustrates the processing of accelerometer outputs to obtain translational and rotational acceleration as discussed above. In FIGURE 2, the total acceleration of the vehicle 11 in the direction of the sensitive axis of the accelerometers is designated as A, and this total acceleration has a component $A_{RB}$ which is the rigid-body component of A, and a component $A_B$ which is the acceleration due to bending motion. Accelerometers 41, 42, 43 may be provided at the different locations in the vehicle, as in FIGURE 1, to produce output signals which are processed to provide a measure of the rigid-body translational acceleration, while similar accelerometers 51, 52, 53 are employed to produce signals which are processed to provide a measure of the rigid-body rotational acceleration.

The outputs from accelerometers 41, 42, 43 are supplied to associated networks 46, 47, 48 which have the functional form shown. These networks operate on the accelerometer output signals in accordance with the indicated processing functions, and the network outputs are combined in a summing device 49 to produce an output which corresponds to the rigid-body translational acceleration, with the acceleration due to bending motion removed therefrom.

Similarly, the outputs of accelerometers 51, 52, 53 are supplied as inputs to associated networks 56, 57, 58 which have the functional form shown and which operate on these signals in accordance with the indicated processing functions. The outputs from networks 56, 57, 58 are combined in a summing device 59 to produce an output signal which represents the rigid-body rotational acceleration, with the acceleration due to bending motion removed.

Relative to the effects of errors in the modal data on the operation of the system, the following comments apply. An analysis of the effects of modal errors on motion displays of a typical launch vehicle indicates that when the amplitude of the rigid-body pitch attitude is greater than or equal to the amplitude of the bending motion at the nose of the vehicle, the error in the pitch-attitude display will always be less than 16% if the modal slope errors do not exceed either +50% or −50%.

Further, an analysis of the influence of modal errors on the stability of the closed-loop control system indicates that certain combinations of modal errors tend to degrade stability of at least one of the bending modes; whereas, other combinations of modal errors tend to enhance mode stability. For modal errors of 10% or less, and those combinations of modal errors that tend to degrade stability, no instability occurred in either mode when the loop was closed with nominal gain. When the error coefficients are positive, stability is maintained without degradation. It is possible to ensure that the error coefficients are always positive by biasing the nominal value of the modal slopes. This is equivalent to the use of structural feedback to stabilize the bending modes in the presence of errors in the modal data.

It will be seen that the present invention provides a method for extracting rigid-body motion from the total motion of a flexible body, and that this method is independent of the relative frequencies of the motions involved in the system. It will be appreciated that although the illustrative examples of the invention shown in FIGURES 1 and 2 assumed that the motion of the system could be adequately described by two bending modes, thus requiring sensors at only three locations on the vehicle, it will be apparent that any appropriate number ($n$) of such bending modes may be taken into account in calculating the processing functions and that ($n+1$) sensor locations may then be employed to provide signals which are operated on by these processing functions.

It will also be seen that although this invention requires the use of more sensors than the prior art systems, these additional sensors are not redundant but are employed to increase the amount of sensed information.

Further, although the invention has been disclosed in connection with space vehicles and aircraft, it will be apparent that the invention may be employed in other situations where it is desired to separate rigid-body motion from bending motion and where conventional filtering techniques are ineffective.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. Apparatus for minimizing the bending motion components of signal intelligence derived from conditions occurring during travel of a flexible vehicle body while maximizing the desired rigid-body motion components of the overall sensed intelligence, comprising:
   a plurality $n+1$ of first sensor disposed at different locations in said body for generating a plurality of displacement signals which are a function of the displacements of said body at said locations;
   a plurality $n+1$ of second sensor means disposed at different locations in said body for generating a plurality of rate signals which are a function of the rates of displacement of said body at said locations;
   processing means for modifying said displacement signals and said rate signals by processing functions which are determined by the elastic properties of said body in accordance with the equation $$P_{\text{p}i}(\psi) = \frac{\Phi_{i o}}{\Delta_{\text{p}}}$$

where $\Phi_{io}$ and $\Delta_p$ are the cofactor and determinant, respectively, of the matrix for the modal slopes $\psi$ of a number $n$ of bending modes in said body at said $n+1$ locations of said sensors; and
   means for combining said modified displacement signals and said modified rate signals to produce a resultant signal in which the rigid-body motion components are maximized.

2. Apparatus in accordance with claim 1 in which said first sensor means are attitude gyros responsive to the angular displacement of said body about a given axis in said body, and said second sensor means are rate gyros responsive to the rate of angular displacement of said body about said given axis.

3. Apparatus in accordance with claim 1 including:
   a plurality of third sensor means disposed at said different locations in said vehicle body and responsive to the acceleration of said vehicle body for producing a plurality of acceleration signals;
   a plurality of acceleration signal multipliers for modifying said acceleration signals in accordance with processing functions determined by the elastic properties of said body; and
   means for supplying said modified acceleration signals to said combining means jointly with said modified displacement signals and said modified rate signals.

4. Apparatus in accordance with claim 3 in which said third sensor means includes a plurality of accelerometers responsive to the translational acceleration of said vehicle body and a plurality of accelerometers responsive to the translational acceleration of said vehicle body.

5. Apparatus in accordance with claim 4 in which said processing functions for said displacement signals and said rate signals are of the form given in the equation $$P_{\text{p}i}(\psi) = \frac{\Phi_{i o}}{\Delta_{\text{p}}}$$

where $\Phi_{io}$ and $\Delta_p$ are the cofactor and determinant, respectively, of the matrix for the modal slopes $\psi$ of a number $n$ of bending modes in said body at said $n+1$ locations of said rate and displacement sensors;
said processing functions for said rotational acceleration signals are of the form given in the equation $$P_{\text{p}i}(\phi) = \frac{\Phi_{i p}}{\Delta_{\text{A}}}$$

where $\Phi_{ip}$ and $\Delta A$ are the cofactor and determinant, respectively, of the matrix for the modal displacements $\phi$ of a number $n$ of bending modes in said body at said locations of said acceleration sensors; and
said processing functions for said translational acceleration are of the form given by the equation $$P_{\text{T}i}(\phi) = \frac{\Phi_{i T}}{\Delta_{\text{A}}}$$

where $\Phi_{iT}$ and $\Delta_A$ are the cofactor and determinant, respectively, of the matrix for the modal displacements $\phi$ of a number $n$ of bending modes in said body at said locations of said acceleration sensors.

References Cited
UNITED STATES PATENTS
| | | | |
|---|---|---|---|
| 3,087,333 | 4/1963 | Newell | 244—3.2 |
| 3,231,726 | 1/1966 | Williamson | 244—3.2 |
| 3,237,887 | 3/1966 | Theiss | 244—3.2 |

BENJAMIN A. BORCHELT, *Primary Examiner.*

T. H. WEBB, *Assistant Examiner.*

UNITED STATES PATENT OFFICE
Certificate of Correction

Patent No. 3,374,966                                                        March 26, 1968

James C. Howard

It is certified that error appears in the above identified patent and that said Letters Patent are hereby corrected as shown below:

Column 3, lines 42 to 44, Equation (1) should appear as shown below:

$$\frac{\partial^2}{\partial x^2} EI(x) \frac{\partial^2 y(x,t)}{\partial x^2} + m(x) \frac{\partial^2 y(x,t)}{\partial t^2} = P(x,t)$$

column 4, lines 18 and 19, Equation (5) should appear as shown below:

$$M_j \ddot{q}_j(t) + K_j q_j(t) = F_j(t)$$

lines 64 to 66, Equation (11) should appear as shown below:

$$\ddot{q}_j + 2\zeta_j \omega_j \dot{q}_j + \omega_j^2 q_j = \frac{F_j}{M_j}$$

lines 72 to 75, Equation (12) should appear as shown below:

$$y(x,t) = \sum_{j=T,P,1}^{n} \varphi_j(x) q_j(t)$$

column 5, lines 17 to 19, Equation (14) should appear as shown below:

$$y(x,t) = q_T + (x - x_{cg}) q_P + \sum_{j=1}^{n} \varphi_j(x) q_j(t)$$

lines 27 to 29, Equation (15) should appear as shown below:

$$\theta_i = \frac{\partial y}{\partial x} = q_P + \frac{\partial \varphi_1(x_i)}{\partial x} q_1 + \ldots + \frac{\partial \varphi_n(x_i)}{\partial x} q_n$$

lines 31 to 33, Equation (16) should appear as shown below:

$$\theta_i = q_P + \sum_{j=1}^{n} \frac{\partial \varphi_j(x_i)}{\partial x} q_j(t)$$

column 6, lines 59 to 61, Equation (30) should appear as shown below:

$$P_{p2}(\psi) = \frac{\Psi_{20}}{\Delta_p} = \frac{-(\psi_{11}\psi_{32} - \psi_{12}\psi_{31})}{\Delta_p}$$

column 8, lines 66 to 68, Equation (37) should appear as shown below:

$$A_i = \left[ \ddot{q}_T + (x_i - x_{cg})\ddot{q}_P + \sum_{j=1}^{n} \varphi_{ij}\ddot{q}_j \right]$$

column 9, lines 3 to 9, Equation (38) should appear as shown below:

$$\begin{pmatrix} A_1 \\ A_2 \\ \vdots \\ A_n \\ A_{n+1} \\ A_{n+2} \end{pmatrix} = \begin{pmatrix} 1 & (x_1-x_{cg}) & \varphi_{11} & \varphi_{12} & \cdots & \varphi_{1n} \\ 1 & (x_2-x_{cg}) & \varphi_{21} & \varphi_{22} & \cdots & \varphi_{2n} \\ \vdots & \vdots & \vdots & \vdots & \cdots & \vdots \\ 1 & (x_n-x_{cg}) & \varphi_{n1} & \varphi_{n2} & \cdots & \varphi_{nn} \\ 1 & (x_{n+1}-x_{cg}) & \varphi_{n+1,1} & \varphi_{n+1,2} & \cdots & \varphi_{n+1,n} \\ 1 & (x_{n+2}-x_{cg}) & \varphi_{n+2,1} & \varphi_{n+2,2} & \cdots & \varphi_{n+2,n} \end{pmatrix} \begin{pmatrix} \ddot{q}_T \\ \ddot{q}_P \\ \vdots \\ \ddot{q}_n \end{pmatrix}$$

line 36, the equation should appear as shown below:

$$\varphi_{iP} = (x_i - x_{cg}) \quad i = 1, 2, \ldots, n+2$$

line 40, Equation (41) should appear as shown below:

$$[\ddot{Q}] = [\varphi]^{-1}[A]$$

lines 56 to 61, Equation (43) should appear as shown below:

$$\ddot{q}_T = \frac{1}{\Delta_A}(\Phi_{1T}A_1 + \Phi_{2T}A_2 + \ldots \Phi_{n+1,T}A_{n+1} + \Phi_{n+2,T}A_{n+2})$$

that is $$\ddot{q}_T = \frac{1}{\Delta_A} \sum_{i=1}^{n+2} \varphi_{iT} A_i$$

lines 71 to 74, Equation (44) should appear as shown below:

$$\ddot{q}_T = \sum_{i=1}^{n+2} P_{Ti}(\varphi) A_i$$

column 10, lines 26 to 28, the equation should appear as shown below:

$$P_{pi}(\varphi) = \frac{\varphi_{iP}}{\Delta_A}$$

3,374,966

Signed and sealed this 9th day of September 1969.

[SEAL]
Attest:
EDWARD M. FLETCHER, JR.,
*Attesting Officer.*

WILLIAM E. SCHUYLER, JR.,
*Commissioner of Patents.*